H. H. EATON.
CUTTING MACHINE.
APPLICATION FILED FEB. 10, 1917.

1,249,930.

Patented Dec. 11, 1917.
2 SHEETS—SHEET 1.

INVENTOR
Harrison H. Eaton
By his Attorney
Nelson R. Ronald

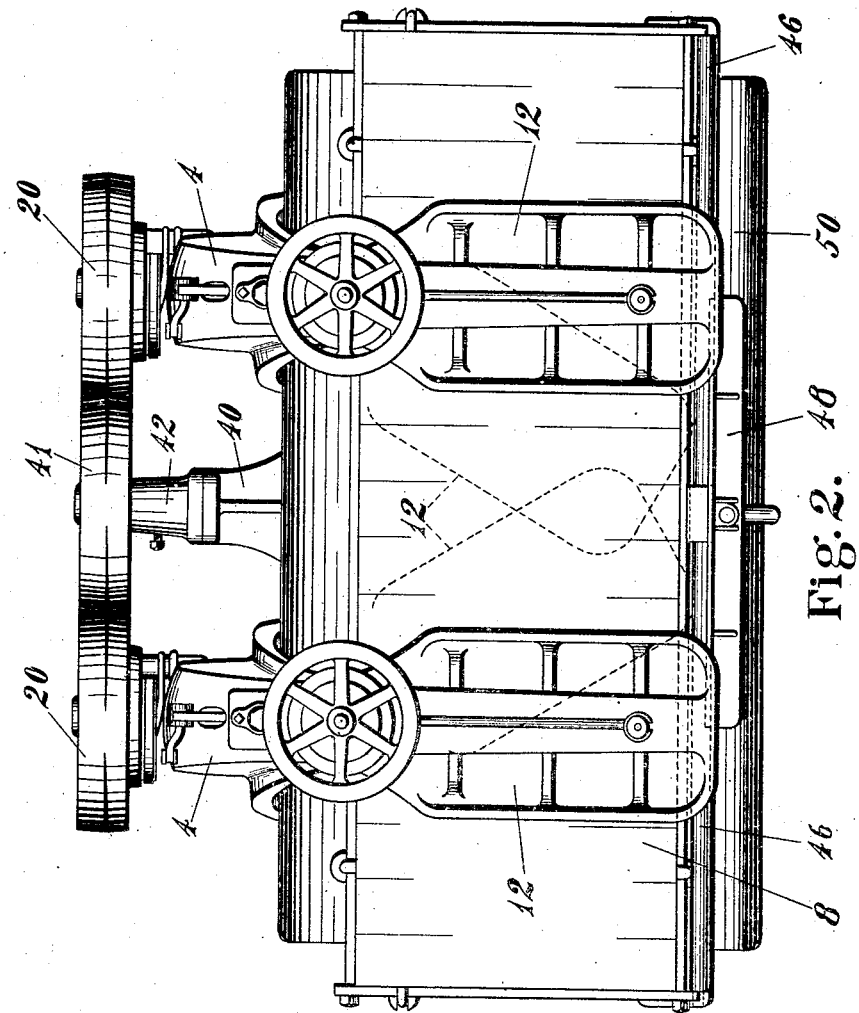

UNITED STATES PATENT OFFICE.

HARRISON H. EATON, OF BEVERLY, MASSACHUSETTS, ASSIGNOR TO UNITED SHOE MACHINERY COMPANY, OF PATERSON, NEW JERSEY, A CORPORATION OF NEW JERSEY.

CUTTING-MACHINE.

1,249,930.     Specification of Letters Patent.     Patented Dec. 11, 1917.

Application filed February 10, 1917. Serial No. 147,893.

*To all whom it may concern:*

Be it known that I, HARRISON H. EATON, a citizen of the United States, residing at Beverly, in the county of Essex and State of Massachusetts, have invented certain Improvements in Cutting-Machines, of which the following description, in connection with the accompanying drawings, is a specification, like reference characters on the drawings indicating like parts in the several figures.

This invention relates to machines for cutting sheet material, and more particularly to machines for dieing out blanks from thin sheet material such as upper stock for boots or shoes.

A type of machine in common use for dieing out upper stock in shoe manufacture, known commercially as the clicking machine, comprises a cutting bed upon which a sheet of stock is placed and a presser member which is movable over the bed to different positions corresponding to different locations of a die upon the stock and is movable also in a direction to force the die through the stock after the member has been moved to a position over the die. Such a machine is shown, for example, in United States Letters Patent No. 921,503, granted on May 11, 1909 upon the application of Arthur Bates, the construction shown in this patent comprising a presser member mounted to swing about a vertical axis located at the rear of the cutting block or bed midway between the ends of the bed. An important advantage of this type of machine for cutting upper stock is that the presser member may be moved away from any portion of the bed over which it may be desired to place the die for cutting a blank, thus permitting the light to fall without obstruction upon that portion of the stock which is next to be cut and enabling the operator readily to view the stock and to position the die as required for cutting the stock in the most economical manner. The fact, moreover, that upper stock is comparatively thin and easy to cut renders it feasible to use a presser member which is supported at one end only and which is sufficiently light in weight to permit it to be swung readily from one position to another.

In machines of the type shown in the above mentioned Bates patent practical considerations render it inadvisable to extend the presser member beyond a certain approximate limit of length. Obviously any considerable increase in the length of the member necessitates a corresponding increase in its thickness, for the sake of strength, as well as an increase in the mass of the frame of the machine in order to guard against breakage under the increased leverage of the presser member, and such increase in the length and thickness of the member beyond a certain limit is undesirable as tending to render the machine difficult and slow to operate. It is a well known fact, moreover, that in a machine of this type the outer end portion of the presser member is likely to be less positive in its action upon the die than other portions of the member, and this tendency, which is due in large measure to the yield in the frame and other portions of the machine under the leverage of the presser member, increases in proportion to increase in the length of the member. Furthermore, the cutting block should not be too broad to prevent the operator from reaching conveniently from front to back in placing the die, and the presser member should not extend far enough in front of the block to make it necessary for the operator to change his position in swinging the member from one side to the other. Practical considerations therefore usually determine a limit of length for the presser member such as to render it operative over substantially all portions of a bed usually from about 36 to 40 inches long, and a machine as thus constructed fulfils all requirements for dieing out blanks from sheets of the usual dimensions such as skins from which the uppers of shoes are formed.

An important and increasing use of the clicking machine at the present time, however, is for cutting blanks from sheets or rolls of fabric such as lining material for shoes or upper material for use in place of leather, and such material is frequently manufactured in widths of 60 inches or more. In the use of clicking machines of the usual construction for this purpose it has been necessary to shift the material laterally on the cutting block in order to die out blanks from the entire width of the material, and such shifting of the material not only requires time but where a heavy roll of fabric is in use also involves considerable extra labor. It is accordingly an object of this invention to provide a machine for cutting such relatively wide sheets or rolls of material without the necessity for shifting the position of the material laterally, and without sacrificing any of the advantages of that type of clicking machine which is now in extensive use.

To the above and other ends, a feature of this invention resides in a construction comprising a cutting bed and a plurality of presser members mounted at one side of the bed for movements over different portions of the area of the bed in such manner as to permit dieing-out operations to be performed over a width of material on the bed extended beyond the range of action of a single presser member. In such a machine the cutting block may be long enough to receive the entire width of the material upon its working surface, and all portions of the width of the material may be cut by the use of different presser members in turn, thus permitting the use of presser members of such length as may be desired for insuring ease of operation and the most effective results. In the construction shown the presser members are mounted to swing about axes at the back of the bed, thus preserving the advantages of the well known type of clicking machine in which the presser member and the clutch actuating mechanism are always within convenient reach of the operator and in which the presser member may be readily swung to one side or the other, as found most convenient, in order to afford the operator a clear view of that portion of the stock upon which he desires to place the die.

A further feature of the invention consists in the combination of a cutting bed and presser members mounted at one side of the bed for movements in such relation to each other as to cause a portion of the working surface of the bed to lie within the range of action of two adjacent presser members. This arrangement is of great practical importance for the reason that an economical use of the material requires that a die be placed frequently over an area of the stock different portions of which under the die may be nearer respectively to the axes of different presser members, and with the presser members thus arranged a die so placed may receive an operative blow from one of the members over substantially all portions of the blade with a consequent insurance of even and effective cutting. A further important advantage of this arrangement is that the paths of swinging movement of adjacent presser members cover substantially that portion of the bed which is at the front and midway between the axes of the members, thus permitting the material to be cut over substantially the full width as well as length of the bed and making it unnecessary to bring a fresh portion of the material up over the bed as frequently as would otherwise be required.

These and other features of the invention, including certain details of construction and combinations of parts, will now be described with reference to the accompanying drawings and pointed out in the claims.

In the drawings,

Fig. 2 is a plan view of the machine, and

Figure 1:
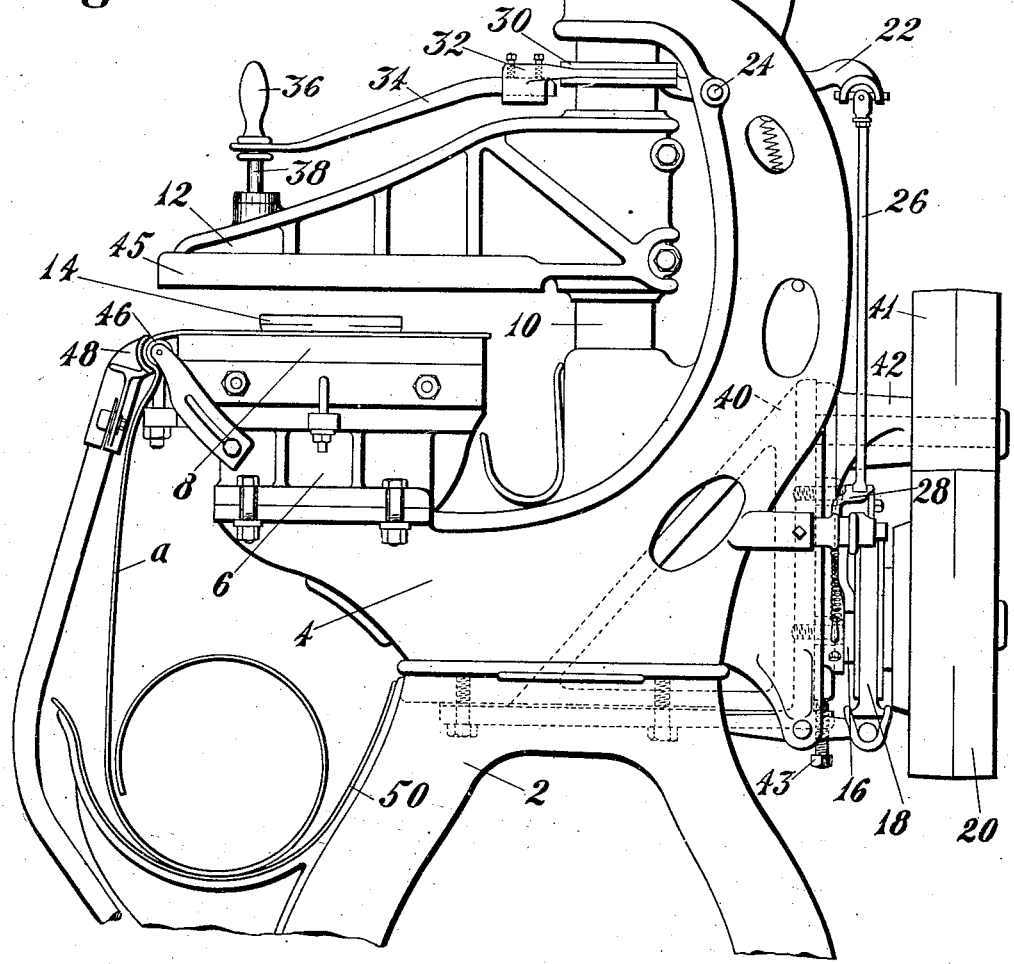
Figure 1 is a view in side elevation of a machine in which the invention is embodied.

The machine shown is provided with a base 2 upon which are bolted in laterally spaced relation two frame castings 4, and bolted to the front portions of the members 4 is a casting 6 which extends across the machine from side to side and serves to support the cutting bed comprising, in the illustrative construction, a sectional wooden block of a well-known type the dimension of which from front to back may be substantially the same as in clicking machines heretofore in use while the lengthwise dimension is much greater than in prior machines of this type in order to adapt the machine for operation upon material of unusual width. Each of the castings 4 is provided with vertically alined upper and lower bearings in which is mounted for both reciprocatory and turning movements a post 10 having secured thereto a projecting arm 12, herein termed a presser member. The member 12 may thus be swung into position over a die placed in the desired location upon a sheet of stock on the bed within the field of operation of the member, and upon the downward movement of the post 10 the member 12 will strike the die and force it through the stock to cut the blank in a manner well understood. In Fig. 1 a die 14 is shown, for purposes of illustration, positioned upon a sheet of stock a for engagement by one of the presser members 12.

Each of the posts 10 is connected to a driving shaft 16 to cause the post to be moved downward and then returned to starting position through a single revolution of the shaft, the shaft being held normally stationary with the post in its uppermost position by means of a brake 18. Mounted loosely on the shaft 16 is a driving pulley 20, and a suitable clutch, not shown herein in detail, is arranged to coöperate with the brake 18 to cause the shaft to be turned a single revolution by the pulley at each actuation of the clutch by the operator and then stopped with the parts of the machine in the position shown. The clutch actuating means comprises a lever 22 pivoted at 24 to the frame 4 and connected by a link 26 to a pivoted clutch controlling arm 28, the lever 22 having a front portion 30 loosely encircling the post 10 and providing a swivel bearing for a bracket 32 from which extends forwardly an arm 34 having a forked front end engaged by a handle 36 vertically movable on a fixed rod 38 on the presser member 12. The handle 36 thus serves as means whereby the operator may both trip the clutch and swing the member 12 to any desired position. In the construction shown each of the presser members 12 is operated and controlled, as above described, by mechanism which is a duplicate of that for the other member, this mechanism comprising features more fully shown and described in the prior United States Letters Patent to Bates, hereinbefore mentioned, and in patents to Eaton, No. 1,004,757, granted Oct. 3, 1911, and to Bates, No. 1,011,903, granted Dec. 19, 1911. Reference accordingly may be made to these patents for a more complete understanding of the details of construction of the operating means above described.

Figure 3:
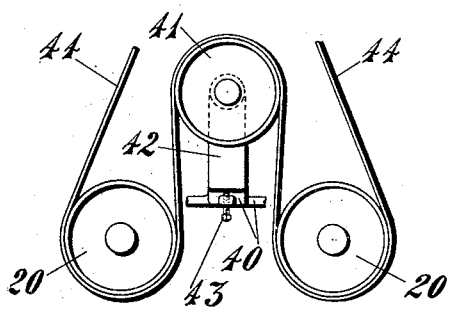
Fig. 3 is a view in rear elevation, on a reduced scale, illustrating the construction and arrangement of the driving means.

Supported on a bracket 40 on the rear of the machine is an idle pulley 41 which is mounted on a holder 42 vertically adjustable in guideways in the bracket 40 and arranged to position the pulley 41 between and somewhat above the pulleys 20. A screw 43 is arranged to determine the adjusted position of the holder 42. A belt 44 runs over the pulley 41 and under the pulleys 20, as shown in Fig. 3, the construction thus permitting both the presser members to be operated from the same unitary driving means but independently of each other in accordance with the tripping of one or the other of the controlling clutches.

By reference to Fig. 2, and particularly to the illustrative dotted line positions of the presser members 12 indicated thereon, it will be observed that the axes of these members are disposed in such relation to each other that an intermediate portion of the area of the cutting bed is within the fields of operation of both members, and that the members have a combined field of operation covering substantially all portions of the working surface of the bed. This arrangement permits a die in any position over the intermediate portion of the working area of the bed to be engaged evenly and operated effectively by one or the other of the presser members the member selected for operation in any particular case depending upon which of the two axes is nearest to the location of the die. The length of each presser member is such that it projects beyond the front edge of the bed 8 no farther than is usual in this type of machine and the axes of these members should be near enough together to permit the material on the intermediate portion of the bed to be cut substantially to the front edge of the bed as in the machine shown. On the other hand in order that the machine may be effective in operation over as great an area of stock as possible, the axes of the presser members should not be nearer together than is required by practical considerations. The distance between the axes should, from such considerations, be greater than the length of one of the presser members and considerably less than the combined lengths of both members. The construction thus permits either member to be swung to an idle position toward the back of the bed in an inward as well as in an outward direction without interference with the other member, provided that the other member has not been previously positioned in such path of movement. In order to avoid the possibility of one of the presser members overlapping the other in an operative movement of one of the members in such manner as to cause breakage, each member is provided with an edge flange 45 of sufficient height to prevent either of the members from being swung under or over the other in any position of vertical movement of either member.

The machine herein shown is provided with means at the front of the bed for holding the material stationary during the dieing-out operation, such means being particularly useful in operating upon rolls of fabric material. The holding means comprises rolls 46 mounted end to end in front of and slightly below the upper surface of the block 8, and a clamp member 48 for clamping the material against the rolls. A trough 50 is positioned below the bed to support the roll of material. In operation, the material is pulled up from the trough and laid over the bed from front to back as far as the rear edge of the bed, and the member 48 is then moved to clamping position. The means herein shown for supporting and clamping the material is more fully described and claimed in a pending application of F. H. Sherman, Serial No. 19,319, filed April 5, 1915.

In the operation of the machine, briefly recapitulated, a die is placed in the desired location upon the stock on the bed 8 and that presser member within whose field of operation the die lies is swung to a position over the die and is caused to operate the die through the clutch tripping movement of the handle 36. The member is then swung aside to permit the die to be placed in position for the next cut. By the use of both presser members in turn the material may thus be utilized over the full extent of the area of the bed. In cutting the material on the intermediate portion of the bed the operator will select for each cutting operation that member which may be most effectively used for operating the die. After the full area of the material on the bed has been utilized with as little waste as possible, the clamping means will be operated to release the material, after which a fresh portion of the material will be disposed on the bed in position for cutting.

While in the construction shown two presser members with their operating mechanism are utilized, it will be understood that the number of these members may be increased as desired for cutting the material of still greater width.

Having described the invention, what I claim as new and desire to secure by Letters Patent of the United States is:—

1. A machine of the class described having, in combination, a cutting bed, and a plurality of presser members mounted for swinging movements about axes at one side of the bed over different respective portions of the area of the bed and also for die operating movements toward the bed, said members being so arranged as to cause a portion of the area of the bed to lie within the fields of operation of more than one of the members.

2. A machine of the class described having, in combination, a cutting bed, and a pair of presser members mounted for movements independently of each other about axes at one side of the bed into operative relation to different respective portions of the bed and also for die operating movements toward the bed, said members having their paths of swinging movement so arranged as to permit either of the members to engage a die upon an intermediate portion of the bed.

3. A machine of the class described having, in combination, a cutting bed, and a pair of presser members mounted for movements about axes at one side of the bed into operative relation to different respective portions of the bed and also for die operating movements toward the bed, said members having their paths of swinging movement so arranged as to permit one of the members to engage substantially all portions of a die so placed as to project over a portion of the area of the bed within the field of operation of the other member.

4. A machine of the class described having, in combination, a cutting bed, and a plurality of presser members mounted for movements over the bed independently of each other about axes arranged in parallel spaced relation at one side of the bed and also for die operating movements toward the bed, said axes being suitably spaced to render one of said members effective over a portion of the bed over which another of the members also is effective.

5. A machine of the class described having, in combination, a cutting bed, and a pair of presser members mounted for movements over the bed about axes arranged in parallel spaced relation at one side of the bed and also for die operating movements toward the bed, said axes being spaced apart a smaller distance than the combined lengths of the presser members.

6. A machine of the class described having, in combination, a cutting bed, and a pair of presser members mounted for movements to different positions over the bed about upright spaced axes at the rear of the bed and for die operating movements also toward the bed, said members having a combined field of operation covering substantially all portions of the working area of the bed.

7. A machine of the class described having, in combination, a cutting bed presenting an uninterrupted cutting surface, a pair of presser members mounted to swing over the bed about spaced axes and having a combined field of operation covering substantially the entire area of the bed, said members being mounted also for die operating movements toward the bed, unitary driving means, and mechanism for connecting either of said members to said driving means to cause it to operate upon a die on the bed while the other member remains inoperative.

8. A machine of the class described having, in combination, a cutting bed presenting an uninterrupted cutting surface, and a pair of presser members mounted at one side of the bed for movements independently of each other over different portions of the bed and also for die operating movements toward the bed, said members being so mounted as to cause a portion of the area of the bed to lie within the fields of operation of both members.

In testimony whereof I have signed my name to this specification.

HARRISON H. EATON.